United States Patent
Sanchez Aguilar et al.

(10) Patent No.: US 11,807,160 B2
(45) Date of Patent: Nov. 7, 2023

(54) PUSH-IN NUT LIGHTING ASSEMBLY

(71) Applicant: Honda Motor Co., Ltd., Tokyo (JP)

(72) Inventors: Antonio Emilio Sanchez Aguilar, Birmingham, MI (US); Tomoya Hagihara, Novi, MI (US); Yusuke Enoto, Tochigi (JP); Masatoshi Kubota, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/540,720

(22) Filed: Dec. 2, 2021

(65) Prior Publication Data

US 2023/0173977 A1 Jun. 8, 2023

(51) Int. Cl.
*B60Q 3/51* (2017.01)
*F21V 19/04* (2006.01)
(Continued)

(52) U.S. Cl.
CPC ............... *B60Q 3/51* (2017.02); *F21V 19/04* (2013.01); *B60Q 1/2669* (2013.01); *B60Q 3/217* (2017.02); *B60Q 3/43* (2017.02); *B60Q 3/44* (2017.02); *B60Q 3/46* (2017.02); *B60Q 3/49* (2017.02); *B60Q 3/50* (2017.02); *B60Q 3/53* (2017.02);
(Continued)

(58) Field of Classification Search
CPC . B60Q 3/217; B60Q 3/43; B60Q 3/44; B60Q 3/46; B60Q 3/49; B60Q 3/50; B60Q 3/51; B60Q 3/53; B60Q 3/54; B60Q 3/56; B60Q 1/2669; B60Q 2900/10; B60Q 3/57; B60Q 3/80; B60Q 3/85; B60Q 3/88; F21S 4/20; F21S 4/22; F21S 4/24; F21S 4/26; F21S 4/28; F21V 15/013; B60R 2021/01006; B60R 2011/0028; B60R 2011/0045; B60R 2011/0047; B60R 2011/0052; B60R 2011/0066; B60R 16/0239
See application file for complete search history.

(56) References Cited

U.S. PATENT DOCUMENTS

| 8,089,773 B2 | 1/2012 | Loibl et al. |
| 8,482,680 B2 | 7/2013 | Takata et al. |

(Continued)

FOREIGN PATENT DOCUMENTS

| CN | 203446145 | 2/2014 | |
| DE | 20215834 U1 * | 4/2004 | ............... F21S 4/28 |

(Continued)

OTHER PUBLICATIONS

Machine translation of DE 20215834 U1 retrieved from the FIT database of PE2E search. (Year: 2023).*

*Primary Examiner* — Colin J Cattanach
(74) *Attorney, Agent, or Firm* — RANKIN, HILL & CLARK LLP; Mark E. Duell (57) ABSTRACT

A housing for a circuit includes a top wall that defines an aperture configured for receiving a fastener, and a bottom wall integrally formed with the top wall, positioned directly below the aperture in a height direction, and extended across the aperture with respect to the height direction. The circuit is mounted on a bottom side of the bottom wall. The top wall and the bottom wall define an interior of the housing, and cooperate to obstruct egress of debris from the interior of the housing to the circuit at the bottom side of the bottom wall.

12 Claims, 7 Drawing Sheets

(51) Int. Cl.
| | |
|---|---|
| *F21W 106/00* | (2018.01) |
| *B60Q 3/217* | (2017.01) |
| *B60Q 3/44* | (2017.01) |
| *B60Q 1/26* | (2006.01) |
| *B60R 21/01* | (2006.01) |
| *B60R 11/00* | (2006.01) |
| *F21S 4/22* | (2016.01) |
| *F21V 15/01* | (2006.01) |
| *B60Q 3/54* | (2017.01) |
| *B60Q 3/53* | (2017.01) |
| *B60Q 3/57* | (2017.01) |
| *B60Q 3/56* | (2017.01) |
| *B60Q 3/49* | (2017.01) |
| *B60Q 3/43* | (2017.01) |
| *B60Q 3/46* | (2017.01) |
| *F21S 4/28* | (2016.01) |
| *B60Q 3/88* | (2017.01) |
| *F21S 4/20* | (2016.01) |
| *B60Q 3/80* | (2017.01) |
| *F21S 4/24* | (2016.01) |
| *B60Q 3/85* | (2017.01) |
| *F21S 4/26* | (2016.01) |
| *B60R 16/023* | (2006.01) |
| *B60Q 3/50* | (2017.01) |

(52) U.S. Cl.
CPC .............. *B60Q 3/54* (2017.02); *B60Q 3/56* (2017.02); *B60Q 3/57* (2017.02); *B60Q 3/80* (2017.02); *B60Q 3/85* (2017.02); *B60Q 3/88* (2017.02); *B60Q 2900/10* (2013.01); *B60R 16/0239* (2013.01); *B60R 2011/0028* (2013.01); *B60R 2011/0045* (2013.01); *B60R 2011/0047* (2013.01); *B60R 2011/0052* (2013.01); *B60R 2011/0066* (2013.01); *B60R 2021/01006* (2013.01); *F21S 4/20* (2016.01); *F21S 4/22* (2016.01); *F21S 4/24* (2016.01); *F21S 4/26* (2016.01); *F21S 4/28* (2016.01); *F21V 15/013* (2013.01); *F21W 2106/00* (2018.01)

(56) References Cited

U.S. PATENT DOCUMENTS

| | | | |
|---|---|---|---|
| 8,585,244 B1* | 11/2013 | Liu | F21V 15/013 |
| | | | 362/249.02 |
| 8,985,823 B2 | 3/2015 | Sugiyama | |
| 10,018,556 B2 | 7/2018 | Sakai et al. | |
| 10,190,738 B1* | 1/2019 | James | F21S 4/28 |
| 10,386,546 B2 | 8/2019 | Choi | |
| 10,859,234 B2 | 12/2020 | Suzuki et al. | |
| 11,230,226 B1* | 1/2022 | Aquilina | B60Q 3/54 |
| 2011/0013408 A1* | 1/2011 | Goto | B60Q 1/2669 |
| | | | 362/459 |
| 2012/0162982 A1* | 6/2012 | Wang | F21V 31/005 |
| | | | 362/249.02 |
| 2014/0104866 A1* | 4/2014 | Maeda | B60Q 3/51 |
| | | | 362/549 |
| 2014/0268746 A1* | 9/2014 | Paine | F21S 41/285 |
| | | | 362/249.11 |
| 2016/0059767 A1* | 3/2016 | Kwak | F21S 43/195 |
| | | | 362/520 |

FOREIGN PATENT DOCUMENTS

| | | |
|---|---|---|
| JP | 2005235455 | 9/2005 |
| JP | 5218171 | 6/2013 |
| JP | 6376495 | 8/2018 |
| JP | 6542642 | 7/2019 |
| KR | 20060068305 | 6/2006 |
| KR | 20060104327 | 10/2006 |
| KR | 100741069 | 7/2007 |
| KR | 101605402 | 3/2016 |
| WO | 2019061284 | 4/2019 |

* cited by examiner

PUSH-IN NUT LIGHTING ASSEMBLY

BACKGROUND

Known vehicle assemblies include push-in nuts for fastening vehicle components to each other in relatively short assembly times, with fewer steps, and in a space-efficient manner as compared to alternative fastening means for manufacturing a vehicle. However, such known vehicle assemblies employing a push-in nut can introduce debris in vulnerable locations of the vehicle.

BRIEF DESCRIPTION

According to one aspect, a housing for a circuit includes a top wall that defines an aperture configured for receiving a fastener, and a bottom wall integrally formed with the top wall, positioned directly below the aperture in a height direction, and extended across the aperture with respect to the height direction. The circuit is mounted on a bottom side of the bottom wall. The top wall and the bottom wall define an interior of the housing, and cooperate to obstruct egress of debris from the interior of the housing to the circuit at the bottom side of the bottom wall.

According to another aspect, a vehicle assembly includes a housing, a fastener, and a circuit. The housing includes a top wall that defines an aperture, a bottom wall positioned directly below the aperture in a height direction, and at least one side wall extended in the height direction, connecting the top wall and the bottom wall. The top wall, the bottom wall, and the at least one side wall are integrally formed with each other, define an interior of the housing, and cooperate to obstruct egress of debris from the interior of the housing. The fastener is inserted through the aperture, into the interior of the housing, above the bottom wall in the height direction. The circuit is mounted to a bottom side of the bottom wall, directly below the aperture in the height direction such that the bottom wall covers the circuit from debris introduced into the interior of the housing at the aperture.

According to another aspect, a method of manufacturing a housing for a circuit includes driving a slider in a slider direction toward a molding apparatus, where the slider is inserted into a space defined by the molding apparatus. The method also includes injecting a molding material into the space defined by the molding apparatus such that the molding material forms a housing around the slider. The housing is formed to include a top wall that defines an aperture configured for receiving a fastener, and a bottom wall positioned directly below the aperture in a height direction, and extended across the aperture with respect to the height direction. The top wall and the bottom wall define an interior of the housing. The method also includes mounting a circuit on a bottom side of the bottom wall, wherein the top wall and the bottom wall cooperate to obstruct egress of debris from the interior of the housing to the circuit at the bottom side of the bottom wall.

DETAILED DESCRIPTION

It should, of course, be understood that the description and drawings herein are merely illustrative and that various modifications and changes can be made in the structures disclosed without departing from the present disclosure. In the drawings, like numerals refer to like parts throughout the several views.

Figure 1:
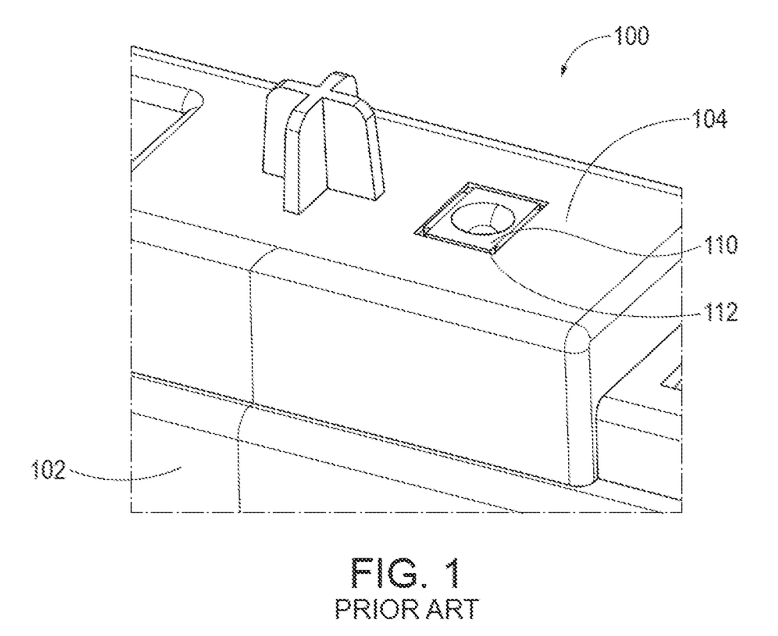
FIG. 1 is a partial perspective view of a prior art vehicle assembly.
Figure 2:
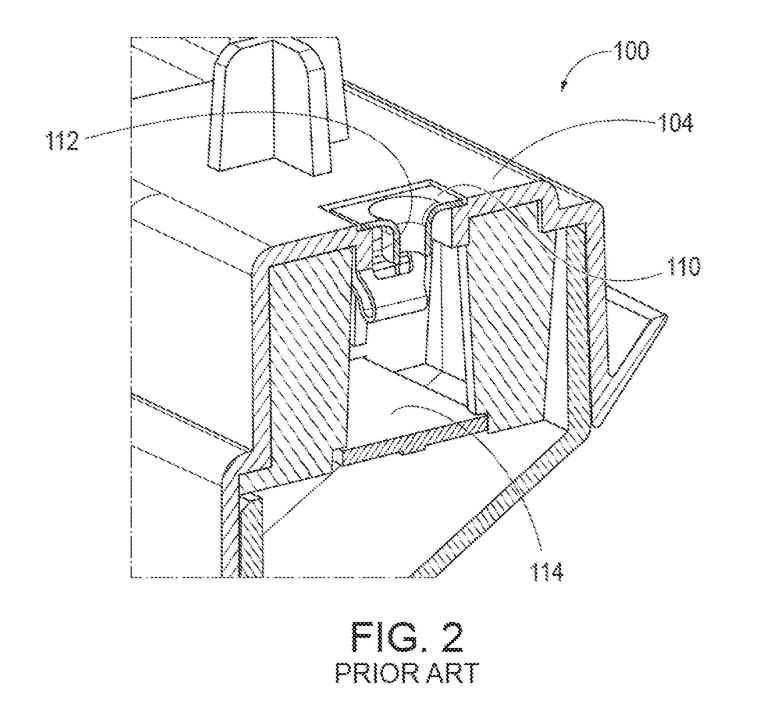
FIG. 2 is a partial perspective cross-sectional view of the prior art vehicle assembly.
Figure 3:
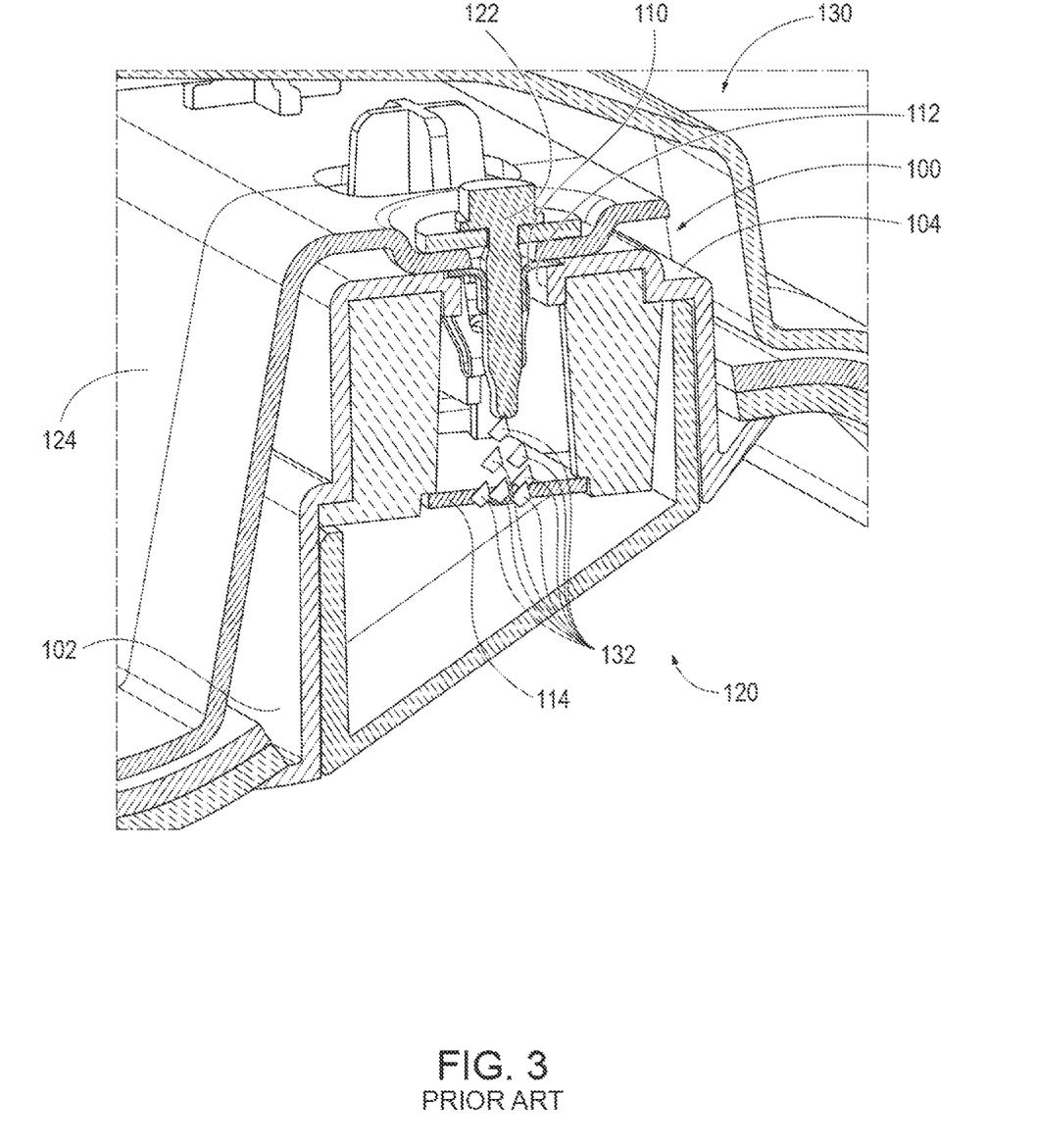
FIG. 3 is a partial perspective cross-sectional view of the prior art vehicle assembly fastened with a headliner stiffener in a vehicle.

FIGS. 1-3 depict a prior art vehicle assembly 100. In FIG. 1, the vehicle assembly 100 includes an injection molded panel 102 that forms a housing 104 for a push-in nut 110 configured to receive a bolt for fastening the vehicle assembly 100 to a vehicle at the panel 102. As shown in FIG. 2, the push-in nut 110 is seated in an aperture 112 defined in the panel 102 above a printed circuit board (PCB) 114 that is part of a lighting circuit 120 in the vehicle assembly 100. As shown in FIG. 3, a bolt 122 inserted in the push-in nut 110 for fixing the panel 102 with a headliner stiffener 124 in a vehicle 130 generates metal shavings 132 against the push-in nut 110, which fall onto the PCB 114. The metal shavings 132 now dispersed on the PCB 114 can cause a short-circuit in the lighting assembly 120, and other damage to the vehicle assembly 100. In this manner, the vehicle assembly 100, including the lighting circuit 120, is vulnerable to debris generated in the housing 104 at the push-in nut 110. As such, there is a demand for a vehicle assembly featuring a housing that supports a push-in nut, and obstructs debris introduced at the push-in nut from reaching a circuit.

Figure 4:
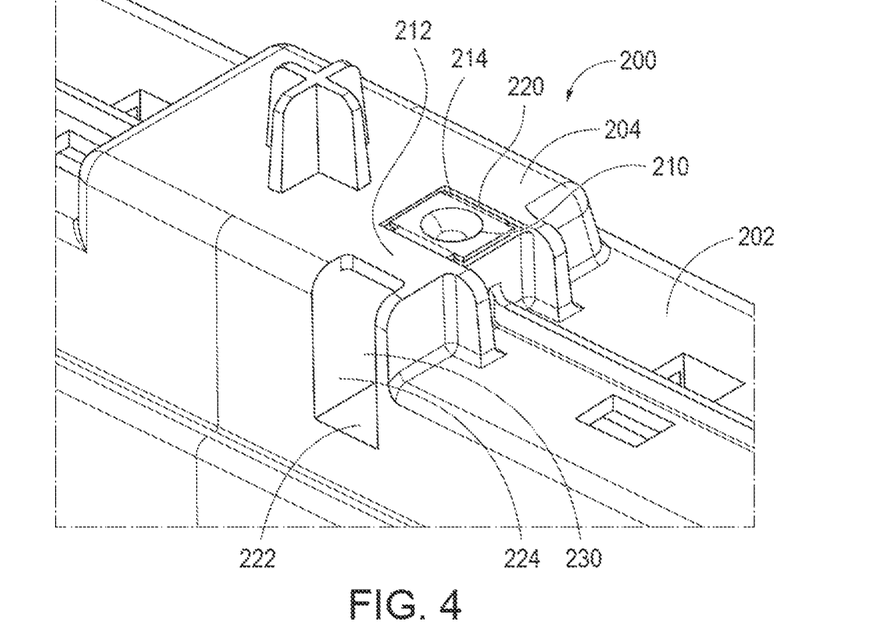
FIG. 4 is a partial perspective view of a vehicle assembly according to the present disclosure.
Figure 5:
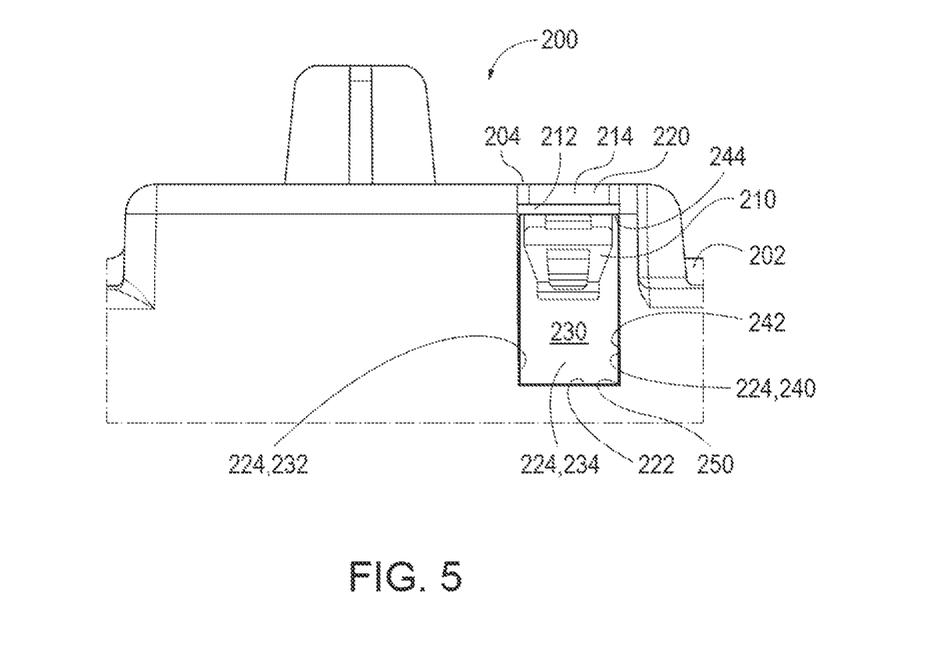
FIG. 5 is a partial side view of the vehicle assembly of FIG. 4.
Figure 6:
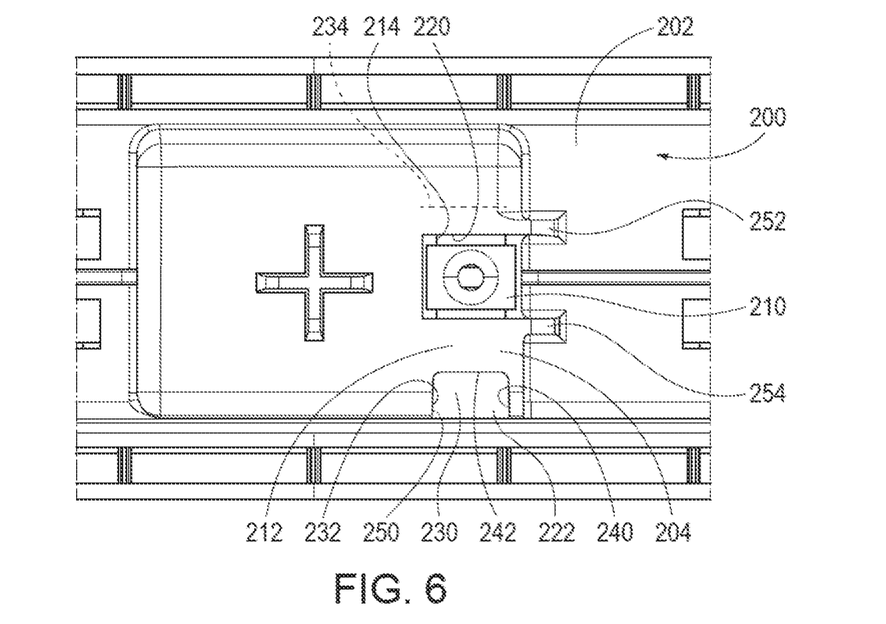
FIG. 6 is a partial top view of the vehicle assembly of FIG. 4.

FIGS. 4-6 depict a vehicle assembly 200 according to the present disclosure that is configured to prevent debris on the PCB as described above with the known vehicle assembly 100. The exemplary vehicle assembly 200 includes a panel 202 that forms a housing 204, and a push-in nut 210 disposed in the housing 204. The push-in nut 210 being configured to receive a bolt inserted in the housing 204 for fastening the vehicle assembly 200 at the panel 202.

The housing 204 includes a top wall 212 that defines an aperture 214, and the push-in nut 210 is seated in the aperture 214 such that the push-in nut 210 is flush with the top wall 212 of the housing 204. A portion of the push-in nut 210 is inserted into the housing 204 through the aperture 214, and supported in the aperture 214 along an inner perimeter 220 of the top wall 212 at the aperture 214.

The housing 204 includes a bottom wall 222 that is spaced from the top wall 212 in a height direction of the vehicle assembly 200. The bottom wall 222 is positioned directly below the aperture 214 in the height direction, and extends transversely across the aperture 214 with respect to the height direction in both a longitudinal direction and a lateral direction of the vehicle assembly 200.

The housing 204 includes at least one side wall 224 extended in the height direction, connecting the top wall 212 and the bottom wall 222. The top wall 212, the bottom wall 222, and the at least one side wall 224 define an interior 230 of the housing 204, and cooperate to obstruct egress of debris from the interior 230 of the housing 204 through and between the top wall 212, the bottom wall 222, and the at least one side wall 224. With this construction, debris in the interior 230 of the housing 204 is not capable of traveling through the top wall 212, the bottom wall 222, or the at least one side wall 224, or traveling through corners formed in the interior 230 of the housing 204 between the top wall 212, the bottom wall 222, and the at least one side wall 224 as means of egress from the interior 230 of the housing 204 to an exterior of the housing 204.

As shown in FIG. 5, the at least one side wall 224 includes a first side wall 232, a second side wall 234, and a third side wall 240. The first side wall 232 and the third side wall 240 are disposed along opposite sides of the housing 204, across the aperture 214 in the longitudinal direction of the vehicle assembly 200. The housing 204 defines an opening 242 at a side of the housing 204 opposite the second side wall 234, across the aperture 214 in the lateral direction of the vehicle assembly 200. The housing 204 defines the opening 242 between the first side wall 232 and the third side wall 240 in the longitudinal direction of the vehicle assembly 200, and defines the opening 242 above the bottom wall 222, between the bottom wall 222 and the top wall 212 in the height direction of the vehicle assembly 200. The opening 242 extends from the exterior of the housing 204 to the interior 230 of the housing 204.

The top wall 212 and the bottom wall 222 extend horizontally, perpendicular to the height direction of the vehicle assembly 200, between the first side wall 232, the second side wall 234, and the third side wall 240. Each of the first side wall 232, the second side wall 234, and the third side wall 240 extend vertically, in the height direction, and connect the top wall 212 and the bottom wall 222 to define the interior 230 of the housing from the top wall 212 to the bottom wall 222.

The first side wall 232, the second side wall 234, and the third side wall 240 define an outer perimeter 244 of the top wall 212 in the interior 230 of the housing 204, and define an outer perimeter 250 of the bottom wall 222 in the interior 230 of the housing 204. The second side wall 234 is continuous with and angled from the first side wall 232, forming a right angle at an interior corner of the housing 204 between the first side wall 232 and the second side wall 234. The third side wall 240 is continuous with and angled from the second side wall 234, forming a right angle at an interior corner of the housing 204 between the second side wall 234 and the third side wall 240. With this construction, the housing 204 defines the interior 230 to have a cuboid shape; although, alternative configurations for the interior 230 defined by the at least one side wall 224 of the housing 204 are contemplated.

As shown in FIG. 6, the first side wall 232 and the third side wall 240 extend farther from the second side wall 234 in the lateral direction of the vehicle assembly 200 as compared to the top wall 212. The first side wall 232 and the third side wall 240 define a gap therebetween in the longitudinal direction of the vehicle assembly 200, at a location outward from the top wall 212 in the lateral direction of the vehicle assembly 200, at a same position as the top wall 212 in the height direction of the vehicle assembly 200.

The housing 204 can include a first rib 252 and a second rib 254 extended outward from the third side wall 240 in the longitudinal direction of the vehicle assembly 200. The first rib 252 and the second rib 254 can connect the third side wall 240 with a portion of the panel 202 extended from the housing 204 in the longitudinal direction of the vehicle assembly 200, and support the third side wall 240 with respect to the panel 202. More specifically, the first rib 252 and the second rib 254 are disposed at opposite sides of the aperture 214 in the lateral direction of the vehicle assembly 200, and are configured to support the housing 204 at the third side wall 240 with respect to the panel 202 at each side of the aperture 214.

Figure 7:
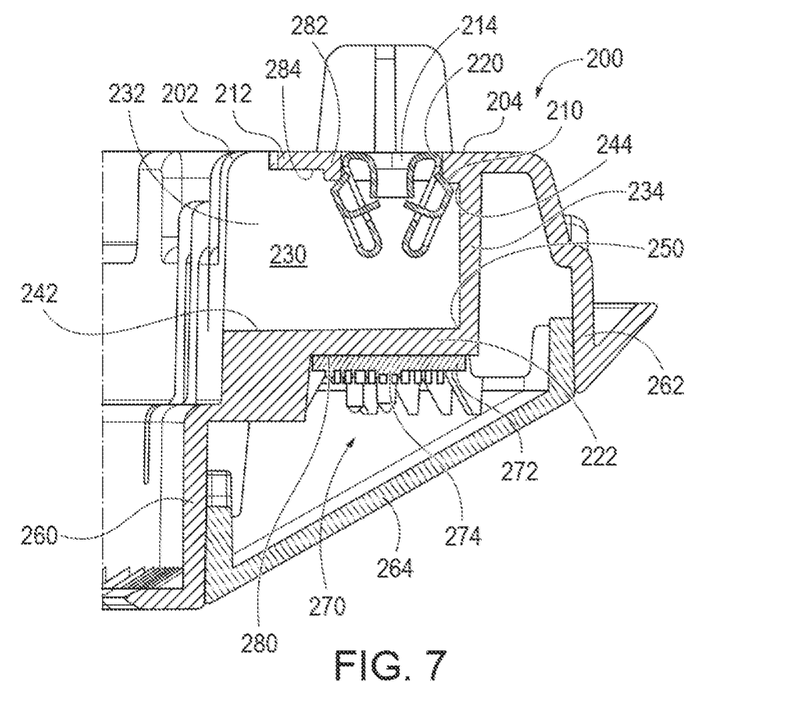
FIG. 7 is a partial cross-sectional view of the vehicle assembly of FIG. 4.

As shown in FIG. 7, the panel 202 includes a first flange 260 which defines part of an outer lateral side wall of the housing 204. The first flange 260 extends downward from the bottom wall 222, at a side of the bottom wall 222 opposite the second side wall 234 in the lateral direction of the vehicle assembly 200, and opposite the opening 242 in the height direction of the vehicle assembly 200. The first flange 260 is located below the opening 242 in the height direction of the vehicle assembly 200, and extends along the panel 202, across a width of the opening 242 in the longitudinal direction of the vehicle assembly 200.

The panel 202 includes a second flange 262 which defines part of an opposite outer lateral side wall of the housing 204. The second flange 262 extends from a corner of the housing 204 formed between the top wall 212 and the second side wall 234. The second flange 262 extends from a side of the second side wall 234 opposite the top wall 212 in the lateral direction of the vehicle assembly 200, and opposite the bottom wall 222 in the height direction of the vehicle assembly 200. The first flange 260 and the second flange 262 retain a lens 264 therebetween in the lateral direction of the vehicle assembly 200, fixing the lens 264 with the panel 202.

The vehicle assembly 200 includes a circuit 270 supported on the panel 202, below the housing 204. The circuit 270 is a lighting assembly including a printed circuit board (PCB) 272 and a lightbulb or similar device 274 mounted on a bottom side 280 of the bottom wall 222. The depicted lightbulb 274 can be any type of lighting element, including a light emitting diode (LED), high-intensity discharge (HID), halogen, incandescent, fluorescent, compact fluorescent lightbulb (CFL), or lamp type of lighting element, or any combination of such types of lighting elements supported in the circuit 270 without departing from the scope of the present disclosure. While the depicted circuit 270 is a lighting assembly including the PCB 272 and the lightbulb 274, the circuit 270 may additionally or alternatively include circuit elements configured to support additional or alternative circuit components for functions additional or alternative to generating light without departing from the scope of the present application.

The first flange 260 and the second flange 262 retain the lens 264 below the circuit 270 such that the housing 204, the first flange 260, the second flange 262, and the lens 264 encase the circuit 270 from the interior 230 of the housing 204. With this construction, the top wall 212, the bottom wall 222, the first side wall 232, the second side wall 234, and the third side wall 240 cooperate to prevent egress of debris from the interior 230 of the housing 204 to the circuit 270. Also, the bottom wall 222, the second side wall 234, the first flange 260, the second flange 262, and the lens 264 cooperate to prevent ingress of debris from the interior 230 of the housing 204 to the circuit 270.

The housing 204 includes a step 282 extended downward from a bottom side 284 of the top wall 212 at the inner perimeter 220 of the aperture 214. With this construction, the top wall 212 is thicker in the height direction of the vehicle assembly 200 at a portion of the top wall 212 that defines the aperture 214 as compared to a portion of the top wall 212 that defines the opening 242. The step 282 is configured for supporting the push-in nut 210 at the inner perimeter 220 of the aperture 214.

Figure 8:
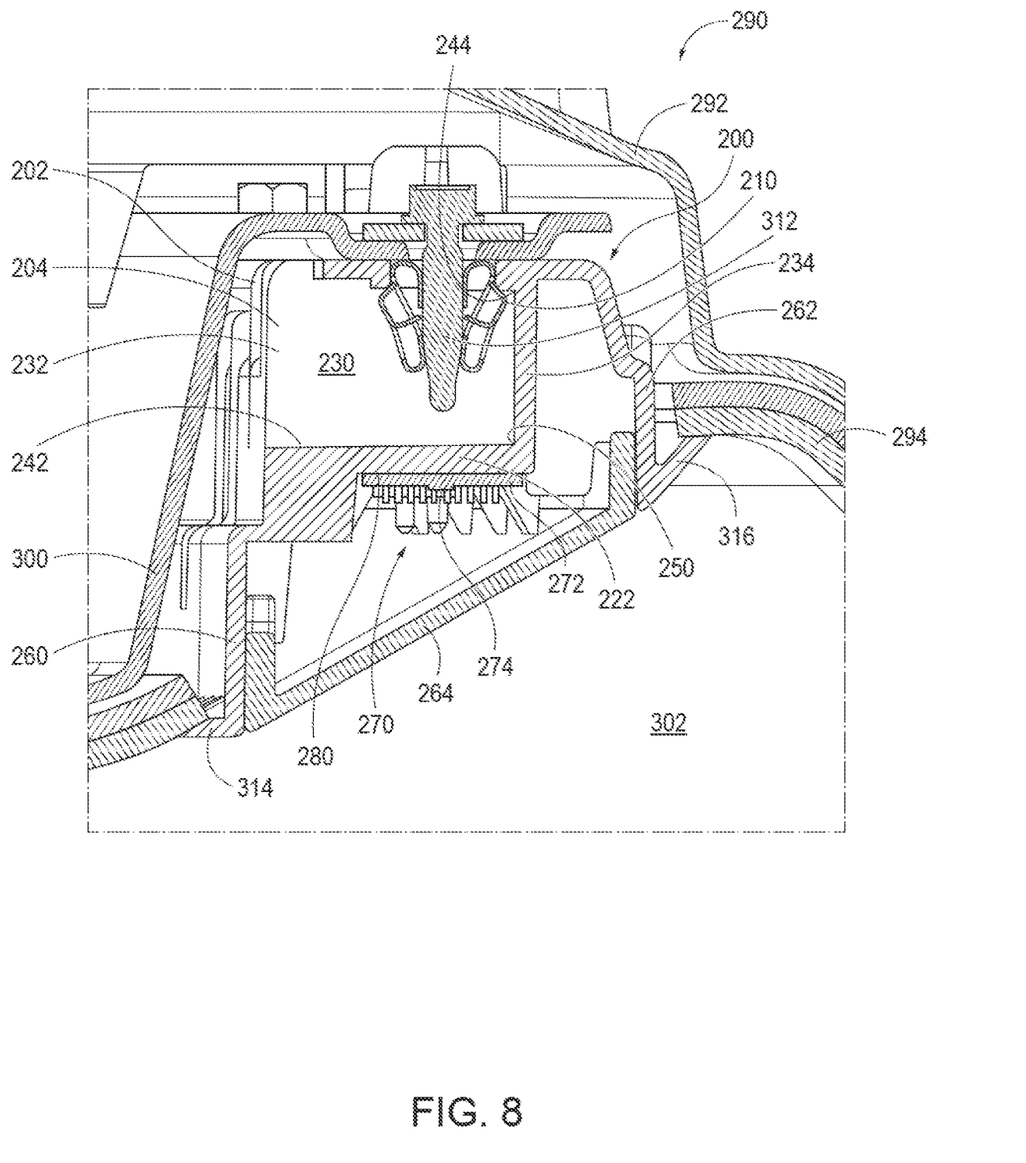
FIG. 8 is a partial cross-sectional view of the vehicle assembly of FIG. 4, fixed in a vehicle.

As shown in FIG. 8, the vehicle assembly 200 is fastened to a vehicle 290 such that the height direction of the vehicle assembly 200 is vertical and aligns with a height direction of the vehicle 290. The vehicle 290 includes a roof 292, a headliner 294, and a headliner stiffener 300. The headliner stiffener 300 is interposed between the roof 292 and the headliner 294 in the height direction of the vehicle 290. The headliner 294 defines a cabin 302 of the vehicle 290, and the circuit 270 is a lighting assembly directed toward the cabin 302, where the lightbulb 274 is configured to generate light which travels through the lens 264, into the cabin 302.

The housing 204 is fixed with the headliner stiffener 300, where the headliner stiffener 300 is disposed along the push-in nut 210 and a top side 304 of the top wall 212. The headliner stiffener 300 is retained between a washer 310 and the top wall 212 at the aperture 214 by a bolt 312. The bolt 312 is inserted through the washer 310, the headliner stiffener 300, the top wall 212, and the push-in nut 210, into the interior 230 of the housing 204, securing the washer 304 against the headliner stiffener 300. In this manner, the push-in nut 210, the washer 310, and the bolt 312 are a fastener configured to fix the vehicle assembly 200 with the vehicle 290 between the headliner stiffener 300 and the top wall 212 at the aperture 214.

The first flange 260 includes a first flange distal end portion 314 fixed with the headliner 294, retaining the headliner 294 against the headliner stiffener 300. The second flange 262 includes a second flange distal end portion 316 fixed with the headliner 294, retaining the headliner 294 against the headliner stiffener 300 at a side of the panel 202 opposite the first flange distal end portion 314 in the lateral direction of the vehicle assembly 200.

The vehicle assembly 200 includes a standoff 318 extended upward from the top wall 212 in the height direction of the vehicle assembly 200. The standoff 318 is positioned offset from the aperture 214 in the longitudinal direction of the vehicle assembly 200, with a same position as the aperture 214 in the lateral direction of the vehicle assembly 200. The standoff 318 is configured for locating the panel 202 with respect to the headliner stiffener 300 when the vehicle assembly 200 is assembled with the headliner stiffener 300.

Figure 9:
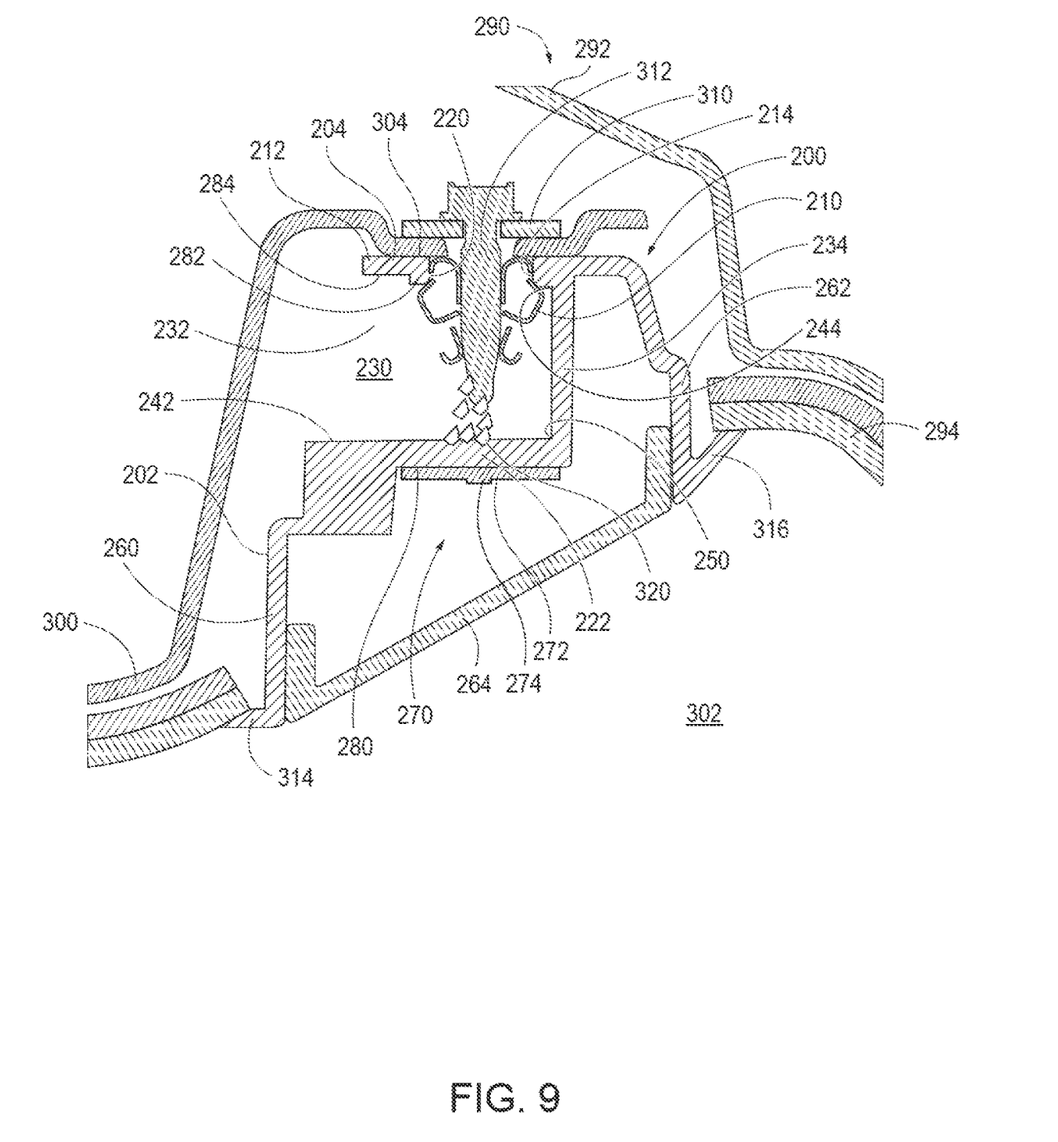
FIG. 9 is a partial cross-sectional view of the vehicle assembly of FIG. 4, with a bolt being inserted through a push nut.

The push-in nut 210 is inserted through the aperture 214, into the interior 230 of the housing 204, directly above the bottom wall 222 in the height direction of the vehicle assembly 200. As shown in FIG. 9, inserting the bolt 312 through the push-in nut 210 generates metal shavings 320 that are debris introduced into the interior 230 of the housing 204 at the aperture 214. The metal shavings 320 fall from the bolt 312 and the push-in nut 210 to the bottom wall 222 in the interior 230 of the housing 204.

The circuit 270 is mounted to the bottom side 280 of the bottom wall 222, directly below the aperture 214 in the height direction of the vehicle assembly 200. The bottom wall 222 extends between the first side wall 232, the second side wall 234, and the third side wall 240 such that the bottom wall 222 covers the circuit 270 from the aperture 214 and the metal shavings 320 in the height direction of the vehicle assembly 200. Because the top wall 212, the bottom wall 222, the first side wall 232, the second side wall 234, and the third side wall 240 cooperate to prevent egress of debris from the interior 230 of the housing 204 to the circuit 270, and because the bottom wall 222, the second side wall 234, the first flange 260, the second flange 262, and the lens 264 cooperate to prevent ingress of debris from the interior 230 of the housing 204 to the circuit 270, the metal shavings 320 are obstructed from traveling to the circuit 270 from the interior 230 of the housing 204.

The panel 202, including the housing 204, the first flange 260, and the second flange 262, is a single injection molded component. As such, the top wall 212, the bottom wall 222, the first side wall 232, the second side wall 234, the third side wall 240, the first flange 260, the second flange 262, and the standoff 318 are integrally formed with each other in the panel 202. Further, each of the top wall 212, the bottom wall 222, the first side wall 232, the second side wall 234, and the third side wall 240 extend continuously with each other and obstruct the metal shavings from passing therethrough or therebetween at the outer perimeter 244 of the top wall 212, the inner perimeter 250 of the bottom wall 222, and the corners formed between the first side wall 232, the second side wall 234, and the third side wall 240.

Figure 10:
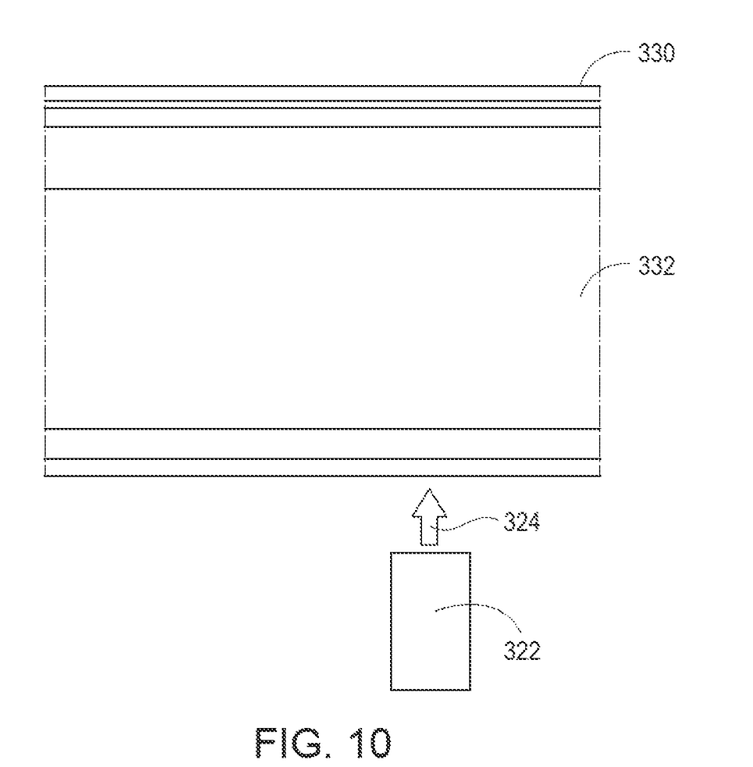
FIG. 10 is a schematic view of a method step for manufacturing the vehicle assembly of FIG. 4.

With reference to FIG. 10, a method of manufacturing the vehicle assembly 200 includes forming the panel 202, including the housing 204, by injection molding. Forming the panel 202 by injection molding includes driving a slider 322 in a slider direction indicated by an arrow 324, along the lateral direction of the vehicle assembly 200 and toward a molding apparatus 330. The slider 322 is inserted into a space 332 defined by the molding apparatus 330, where the slider 322 and the molding apparatus 330 together define the shape of the panel 202, including the housing 204.

Figure 11:
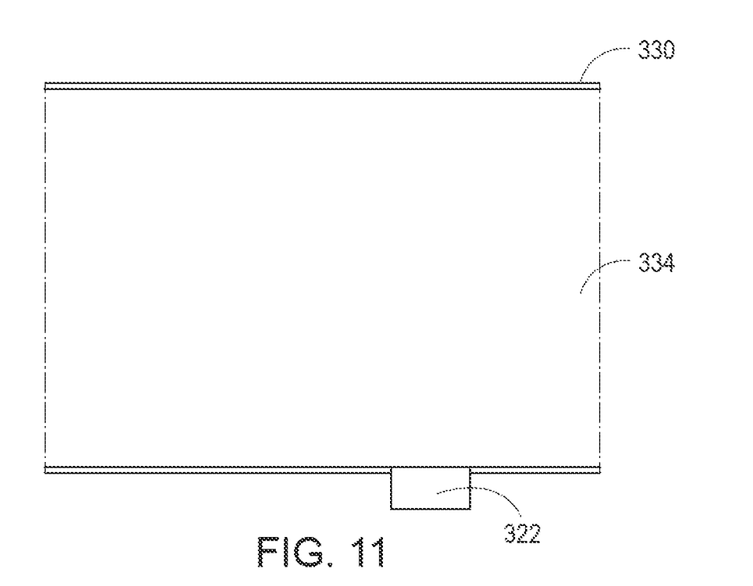
FIG. 11 is a schematic view of another method step for manufacturing the vehicle assembly of FIG. 4.

As shown in FIG. 11, injection molding the panel 202 includes placing a cover 334 of the molding apparatus 330 on the molding apparatus 330 and injecting a molding material into the space 332 defined by the molding apparatus 330, with the slider 322 inserted in the space 332. The slider 322 is a single protrusion which can have a cuboid shape with a rectangular profile taken in the slider direction. The slider 322 has a volume that defines the interior 230 of the housing 204 such that, as shown in FIG. 5, the opening 242 is a slider footprint having a rectangular shape formed around the slider 322 when the molding material is injected into the space 332. With continued reference to FIG. 5, the top wall 212, the bottom wall 222, the first side wall 232, the second side wall 234, and the third side wall 240 are integrally formed with each other from a single injection mold, around the slider 322 in the space 332 defined by the molding apparatus 330 to form the interior 230 of the housing 204 with a cuboid shape.

The top wall 212 is molded to extend horizontally between the first side wall 232, the second side wall 234, and the third side wall 240, and to define the aperture 214 configured for receiving the push-in nut 210. The bottom wall 222 is molded to extend horizontally between the first side wall 232, the second side wall 234, and the third side wall 240, and positioned directly below the aperture 214 in the height direction of the vehicle assembly 200. The first side wall 232, the second side wall 234, and the third side wall 240 are molded to extend vertically in the height direction of the vehicle assembly 200, connecting the top wall 212 and the bottom wall 222.

With reference to FIG. 7, the method of manufacturing the vehicle assembly 200 includes mounting the circuit 270 on the bottom side 280 of the bottom wall 222, where the top wall 212 and the bottom wall 222 cooperate to obstruct egress of debris from the interior 230 of the housing 204 to the circuit 270 at the bottom side 280 of the bottom wall 222. The top wall 212, the bottom wall 222, the first side wall 232, the second side wall 234, the third side wall 240 are integrally formed with each other, define the interior 230 of the housing 204, and cooperate to obstruct egress of debris from the interior 230 of the housing 204 to the circuit 270 at the bottom side 280 of the bottom wall 222.

With this construction, the first side wall 232, the second side wall 234, and the third side wall 240 are formed to define a perimeter of the top wall 212 in the interior 230 of the housing 204, and define a perimeter of the bottom wall 222 in the interior 230 of the housing 204. The first wall 232 is formed at a side of the housing 204 opposite the third wall 240 and across the aperture 214 in a direction perpendicular to the slider direction, and the second side wall 234 is formed at a side of the housing 204 opposite the opening 242.

The step of injecting the molding material into the space 332 defined by the molding apparatus 330 forms the housing 204 with a slider footprint that forms the opening 242. Because the slider 322 can have a cuboid shape and a rectangular profile taken in the slider direction, the interior 230 of the housing 204 is formed with a cuboid shape, and the opening 242 is formed with a rectangular shape taken in the lateral direction of the vehicle assembly 200. While the presently described slider 322 can have a cuboid shape, the slider 322 can embody alternative shapes for insertion into the space 332 defined by the molding apparatus 330, defining the interior 230 of the housing 204 when the molding material is injected into the space 332 defined by the molding apparatus 330.

As shown in FIG. 7, the step of injecting the molding material into the space 332 defined by the molding apparatus 330 forms the housing 204 to include the first flange 260 extended downward from the bottom wall 222 at the side of the housing 204 opposite the second side wall 234. The step of injecting the molding material into the space 332 defined by the molding apparatus 330 forms the housing 204 to include the second flange 262 extended from the side of the housing 204 opposite the first flange 260.

The method of manufacturing the vehicle assembly 200 includes fixing the lens 264 below the circuit 270 in the height direction of the vehicle assembly 200, and between the first flange 260 and the second flange 262 in the lateral direction of the vehicle assembly 200. The lens 264, the first flange 260, the second flange 262, and the bottom wall 222 encase the circuit 270 from the interior 230 of the housing 204.

The step of injecting the molding material into the space 332 defined by the molding apparatus 330 forms the step 282 in the bottom surface 284 of the top wall 212. In this manner, a portion of the top wall 212 defining the aperture 214 is formed thicker in the height direction of the vehicle assembly 200 as compared to a portion of the top wall 212 defining the opening 242. The portion of the top wall 212 forming the step 282 and defining the aperture 214 is configured for supporting the push-in nut 210 in the aperture 214.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A housing for a circuit, the housing comprising:
    a top wall that includes a top side and a bottom side opposite the top side, the top wall defines an aperture extended therethrough, the aperture configured for receiving a fastener;
    a bottom wall that includes a top side and a bottom side opposite the top side, the bottom wall integrally formed with the top wall, positioned directly below the aperture in a height direction such that the top side of the bottom wall faces the bottom side of the top wall, and extended across the aperture with respect to the height direction; and
    at least one side wall extended in the height direction, connecting the top wall and the bottom wall,
    wherein the circuit is mounted on the bottom side of the bottom wall such that the circuit is on an exterior of the housing,
    wherein the bottom side of the top wall and the top side of the bottom wall are spaced in the height direction, and together with the at least one side wall define an interior of the housing, and the aperture extends to the interior of the housing,
    wherein the bottom side of the top wall, the top side of the bottom wall, and the at least one side wall cooperate to obstruct egress of debris from the interior of the housing to the circuit at the bottom side of the bottom wall, and
    wherein the housing defines an opening above the bottom wall, at a side of the bottom wall opposite the at least one side wall, and the opening extends from the exterior of the housing to the same interior of the housing defined by the bottom side of the top wall, the top side of the bottom wall and the at least one side wall.

2. The housing according to claim 1, wherein the at least one side wall extends vertically in the height direction and connects the top wall and the bottom wall to define the interior of the housing from the top wall to the bottom wall.

3. The housing according to claim 1, wherein the top wall, the bottom wall, and the at least one side wall are integrally formed from a single injection mold, around a single slider in a molding apparatus.

4. The housing according to claim 1, wherein the at least one side wall includes a first side wall, a second side wall continuous with and angled from the first side wall, and a third side wall continuous with and angled from the second side wall, and
    wherein the first side wall, the second side wall, and the third side wall define a perimeter of the top wall in the interior of the housing, and define a perimeter of the bottom wall in the interior of the housing.

5. The housing according to claim 4, wherein the first side wall and the third side wall are disposed along opposite sides of the housing, the housing defines an opening above the bottom wall, between the first side wall and the third side wall at a side of the housing opposite the second side wall, and the housing further comprises a flange extending downward from the bottom wall at the side of the bottom wall opposite the second side wall.

6. The housing according to claim 1, wherein the bottom wall extends horizontally across the aperture with respect to the height direction.

7. The housing according to claim 1, further comprising a first flange extended downward from the bottom wall at a side of the housing opposite the at least one side wall.

8. The housing according to claim 7, further comprising a second flange extended from a side of the housing opposite the first flange, wherein the first flange and the second flange are configured to retain a lens below the circuit mounted on the bottom side of the bottom wall, wherein the circuit is a lighting assembly configured to generate light that travels through the lens.

9. The housing of claim 1, wherein the housing is fixed with a headliner stiffener of a vehicle by a fastener inserted through the aperture and into the interior of the housing, above the bottom wall in the height direction, the headliner stiffener being disposed along the top side of the top wall, and wherein the circuit includes a lightbulb configured to generate light which travels through a lens, to a cabin of the vehicle.

10. A vehicle assembly comprising:
a housing including;
a top wall that has a top side and a bottom side opposite the top side and defines an aperture extended therethrough,
a bottom wall that is spaced in a height direction from the top wall, the bottom wall has a top side and a bottom side opposite the top side and is positioned directly below the aperture in a height direction such that the top side of the bottom wall faces the bottom side of the top wall, and
at least one side wall extended in the height direction, connecting the top wall and the bottom wall, wherein the top wall, the bottom wall, and the at least one side wall are integrally formed with each other, define an interior of the housing, and cooperate to obstruct egress of debris from the interior of the housing;
a fastener inserted through the aperture, into the interior of the housing, above the bottom wall in the height direction; and
a circuit mounted to the bottom side of the bottom wall, directly below the aperture in the height direction such that the circuit is on an exterior of the housing and the bottom wall covers the circuit from debris introduced into the interior of the housing at the aperture,
wherein the housing defines an opening above the bottom wall in the height direction, at a side of the housing opposite the at least one side wall in a lateral direction, and the opening extends from an exterior of the housing to the same interior of the housing defined by the top wall, the bottom wall and the at least one side wall.

11. The vehicle assembly of claim 10, wherein the housing includes a first flange extended downward from the bottom wall in the height direction, at the side of the housing opposite the at least one side wall.

12. The vehicle assembly of claim 11, wherein the housing includes a second flange extended from a side of the housing opposite the first flange, the circuit is a lighting assembly, the vehicle assembly further comprises a lens fixed with the housing between the first flange and the second flange, below the circuit, such that the lens, the first flange, the second flange, and the bottom wall encase the circuit from the interior of the housing, and the circuit is configured to generate light that travels through the lens.

* * * * *